RAND & LONG.
Corn Sheller.
No. 33,052. Patented Aug. 13, 1861.
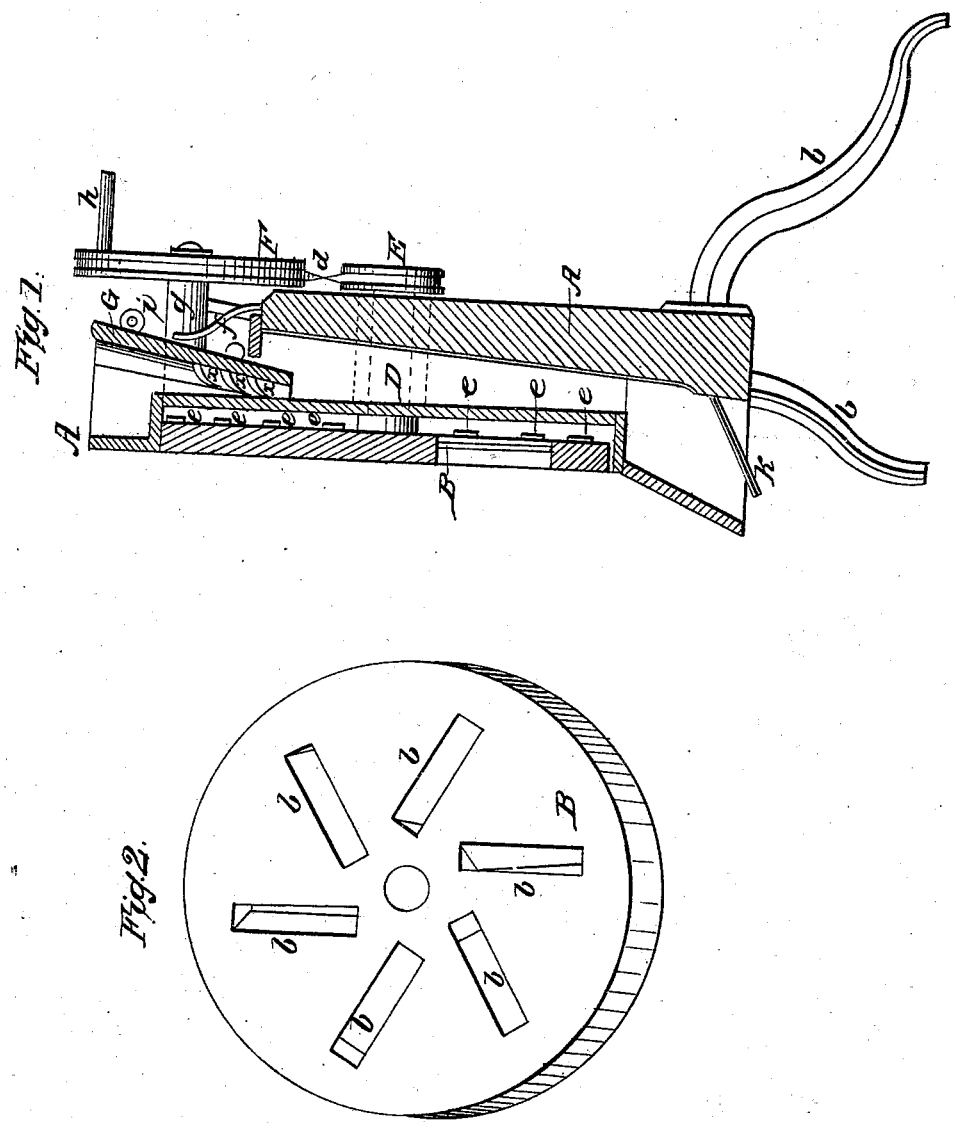
WITNESSES.
T. H. Alexander
Wm Hughes
INVENTORS
J. B. Rand
Wm A N Long

UNITED STATES PATENT OFFICE.

J. B. RAND AND W. A. N. LONG, OF FISHERVILLE, NEW HAMPSHIRE, ASSIGNORS TO J. B. RAND, OF SAME PLACE.

CORN-SHELLER.

Specification of Letters Patent No. 33,052, dated August 13, 1861.

*To all whom it may concern:*

Be it known that we, J. B. RAND and WM. A. N. LONG, of Fisherville, in the county of Merrimack and State of New Hampshire, have invented certain new and useful Improvements in Machines for Shelling Corn; and we do hereby declare the following to be a full, clear, and exact description of the same, reference being had to the annexed drawings, as forming a part of this specification, in which—

Figure (1) represents a side vertical section. Fig. (2) a face of the rubbing wheel, exhibiting the slots.

The nature of our invention consists in providing the rubbing or shelling wheel with slots, and employing it when thus constructed in combination with such other devices as will be hereinafter set forth.

To enable others skilled in the art to make and use our invention, we will now describe its construction and operation.

(A) represents the body of the machine, set upon legs (*b b b*). There should be a circular shield in which the rubbing wheel (B) revolves. Said wheel (B) is provided upon its inner surface with projections or teeth (*e e e*), it is also provided with slots (*b b*) as fully shown in Fig. (2). These slots are for the purpose of separating and throwing out the dust and dirt from the grain, a desideratum much needed in machines of this nature.

It should be particularly observed that the slots (*b b*) are so slanted that as the rubbing wheel is descending the grains of corn cannot escape, while as the wheel passes around and the slots ascend, a draft will be created, which will carry off the dust and other refuse matter through these apertures, thus by their sides being slanted in the same direction no injury is done to the rubbing wheel, while at the same time an important effect is produced.

(G) represents a pressure board which is placed in the position shown, and hinged to the main box (A) by means of ears (*i i*). It should be remarked that the pressure board is scooped out, thus forming a hopper or receptacle for the corn.

(*f*) represents a spring against the pressure board (G) for the purpose of pressing the ear of corn up to the rubbing wheel (B).

(*g*) is a shaft upon which is placed the driving wheel (F) said wheel being operated by means of the handle (*h*).

(E) represents a pulley on one end of shaft (D) while the rubbing wheel (B) is secured at the other, as fully seen in Fig. (1).

(*d*) is a band or belt which communicates motion from driving wheel (F) to pulley (E).

(*x x x*) represent spiral projections on the inner side of pressure board (G) for the purpose of more effectually holding the ear of corn, while the rubbing wheel is revolving.

The operation of our machine is obvious—being only necessary to put it in motion by means of handle (*h*) and drop the ears of corn in at the top as rapidly as the capacity of the machine will admit of. The cobs will slide out to out side—upon the ribs (*k k*)—while the corn will fall through—and the two will thus be separated.

Having thus foully described our invention, what we claim and desire to secure by Letters Patent is—

The rubbing wheel (B) provided with the slots (*b b*), in combination with the pressure board (G) and circular casing, or their equivalents, substantially as and for the purpose specified.

In witness that we claim the foregoing we have hereunto set our hands in the presence of witnesses.

JACOB B. RAND.
WM. A. N. LONG.

Witnesses:
EDWARD M. LONG,
DOUGLAS M. RAND.